United States Patent
Næsje et al.

(10) Patent No.: US 12,049,145 B2
(45) Date of Patent: Jul. 30, 2024

(54) CHARGING ASSEMBLY FOR CHARGING AN ELECTRIC VEHICLE

(71) Applicant: Easee AS, Sandnes (NO)

(72) Inventors: Kjetil Næsje, Sandnes (NO); Jonas Helmikstøl, Hafrsfjord (NO); Steffen Mølgaard, Stavanger (NO); Ola Stengel, Stavanger (NO)

(73) Assignee: Easee AS, Sandnes (NO)

( * ) Notice: Subject to any disclaimer, the term of this patent is extended or adjusted under 35 U.S.C. 154(b) by 247 days.

(21) Appl. No.: 17/420,566

(22) PCT Filed: Jan. 7, 2020

(86) PCT No.: PCT/NO2020/000001
§ 371 (c)(1),
(2) Date: Jul. 2, 2021

(87) PCT Pub. No.: WO2020/145828
PCT Pub. Date: Jul. 16, 2020

(65) Prior Publication Data
US 2022/0105817 A1    Apr. 7, 2022

(30) Foreign Application Priority Data

Jan. 7, 2019  (NO) .................................. 20190023

(51) Int. Cl.
*H02J 7/00* (2006.01)
*B60L 53/16* (2019.01)
(Continued)

(52) U.S. Cl.
CPC ............. *B60L 53/16* (2019.02); *B60L 53/305* (2019.02); *B60L 53/31* (2019.02); *B60L 2240/549* (2013.01)

(58) Field of Classification Search
CPC .... B60L 53/16; B60L 2240/549; B60L 53/31; B60L 53/30; B60L 53/302; B60L 53/305;
(Continued)

(56) References Cited

U.S. PATENT DOCUMENTS

| 2009/0040029 A1* | 2/2009 | Bridges | ................... B60L 55/00 340/12.51 |
| 2011/0016063 A1* | 1/2011 | Pollack | ................... B60L 58/12 320/155 |

(Continued)

FOREIGN PATENT DOCUMENTS

| EP | 3184352 | 6/2017 |
| JP | H06164155 A | 6/1994 |

(Continued)

OTHER PUBLICATIONS

Norwegian Search report for No. 20190023, dated Aug. 2, 2019.
(Continued)

*Primary Examiner* — Binh C Tat
(74) *Attorney, Agent, or Firm* — Andrus Intellectual Property Law, LLP

(57) ABSTRACT

A charging assembly is for charging an electric vehicle. The charging assembly has an electrical socket configured for connecting a charging station to a specific branch an electric vehicle supply installation. The installation has a fuse cabinet and a branch connected to the fuse cabinet. The socket has a data storage medium readable by the charging station. The data storage medium has a data field representing a maximum electrical current that can be drawn from the fuse cabinet by the specific branch, and optionally a data field representing a maximum electrical current that can be drawn by the charging station. The charging station can be coupled to the electrical socket, and is configured for reading the data storage medium including the data fields and for accordingly
(Continued)

adapting the way current is drawn from the branch and provided to the electric vehicle.

24 Claims, 12 Drawing Sheets

(51) Int. Cl.
*B60L 53/30* (2019.01)
*B60L 53/31* (2019.01)

(58) Field of Classification Search
CPC ... B60L 53/63; H02J 9/02; H02J 9/065; H02J 7/34; H02J 7/0068; H02J 7/345; H02J 9/061; H02J 13/00006; H02J 13/00017; H02J 2300/20; H02J 2300/30; H02J 50/001; H02J 50/10; H02J 50/20; H02J 50/40; H02J 7/0029; H02J 7/00306; H02J 7/00308; H02J 7/0042; H02J 3/00
USPC .................................................. 320/108–115
See application file for complete search history.

(56) References Cited

U.S. PATENT DOCUMENTS

| | | | |
|---|---|---|---|
| 2011/0140657 A1 | 6/2011 | Genzel et al. | |
| 2011/0144823 A1* | 6/2011 | Muller | B60L 53/305 |
| | | | 700/297 |
| 2011/0169447 A1* | 7/2011 | Brown | B60L 53/68 |
| | | | 320/109 |
| 2011/0246014 A1 | 10/2011 | Sauper | |
| 2012/0206100 A1* | 8/2012 | Brown | B60L 53/18 |
| | | | 320/109 |
| 2013/0091565 A1* | 4/2013 | Kafer | B60L 53/665 |
| | | | 726/21 |
| 2013/0169227 A1 | 7/2013 | Tremblay | |
| 2014/0035527 A1* | 2/2014 | Hayashigawa | B60L 3/04 |
| | | | 320/109 |
| 2014/0120764 A1 | 5/2014 | Valadas et al. | |
| 2017/0129355 A1* | 5/2017 | Fournier | H02J 7/00 |
| 2018/0126861 A1 | 5/2018 | Dörndorfer et al. | |
| 2020/0070672 A1* | 3/2020 | Vahedi | H02M 7/219 |
| 2020/0180460 A1* | 6/2020 | Watson | B60L 53/68 |
| 2021/0107368 A1* | 4/2021 | Helnerus | B60L 53/11 |
| 2021/0354575 A1* | 11/2021 | Vahedi | H02J 7/0032 |

FOREIGN PATENT DOCUMENTS

| | | |
|---|---|---|
| JP | 2011078288 A | 4/2011 |
| JP | 2012044770 A | 3/2012 |
| JP | 2013534129 A | 8/2013 |
| JP | 2013255343 A | 12/2013 |
| JP | 2014030320 A | 2/2014 |
| JP | 2014519300 | 8/2014 |
| KR | 20160013083 | 2/2016 |
| KR | 20160052250 | 5/2016 |
| KR | 101883390 | 8/2018 |
| NO | 20150959 | 1/2017 |
| WO | 2011102727 | 8/2011 |
| WO | 2012099978 | 7/2012 |
| WO | 2017014643 A1 | 1/2017 |
| WO | 2017044037 | 3/2017 |

OTHER PUBLICATIONS

International Search Report and the Written Opinion for PCT/NO2020/000001, dated Mar. 19, 2020.
Response to the Written Opinion for PCT/NO2020/000001, dated Aug. 18, 2020.
The Second Written Opinion for PCT/NO2020/000001, dated Oct. 12, 2020.
International preliminary Report on Patentability for PCT/NO2020/000001, dated Feb. 15, 2021.

* cited by examiner

CHARGING ASSEMBLY FOR CHARGING AN ELECTRIC VEHICLE

CROSS-REFERENCE TO RELATED APPLICATIONS

This application is the U.S. national stage application of International Application PCT/NO2020/000001, filed Jan. 7, 2020, which international application was published on Jul. 16, 2020, as International Publication WO 2020/145828 in the English language. The International Application claims priority of Norwegian Patent Application No. 20190023, filed Jan. 7, 2019. The international application and Norwegian application are both incorporated herein by reference, in entirety.

FIELD OF THE INVENTION

The present invention relates to a charging assembly for charging an electric vehicle, the charging assembly comprising an electrical socket and a charging station, wherein the electrical socket is configured for receiving the charging station and for connecting the charging station to a specific branch of an electric vehicle supply installation, wherein the electric vehicle supply installation comprises a fuse cabinet and at least one branch connected to the fuse cabinet. Also, the present invention relates to the electrical socket and the charging station as such.

BACKGROUND OF THE INVENTION

As the demand for electric vehicles grows, so does the need for recharging several electric vehicles in the vicinity of each other. Many residential areas and workplace parking lots can be found nowadays having several charging stations.

An EVS installation allows providing a group of charging stations so that several electric vehicles can be recharged at the same time. The EVS installation typically includes a fuse cabinet from which the electrical power is drawn and at least one branch connected to the fuse cabinet, each branch connecting at least one charging station in series.

EVS installations appear in many forms. In some cases, an EVS installation has a few charging stations connected by a single branch to the fuse cabinet, and in other cases it can have three or four branches reaching several building floors, each branch connecting fifteen or more charging stations to the fuse cabinet.

When adding a new charging station to the EVS installation, the former needs to be set up to operate in the latter. This task may be necessary when the EVS installation is first set up, when replacing charging stations afterwards, or when altering the branches of the EVS installation to increase or reduce the number of charging stations available. For example, a charging station may need to be substituted by a new one because of an electronic component that is malfunctioning or a melted plastic part that is putting user safety in jeopardy; in this situation, the new charging station substituting the old one needs to be set up to operate in the EVS installation.

It can be challenging to set up a charging station to operate in an EVS installation.

Due to its complexity and safety risks, the task of setting up known charging stations to operate in an EVS installation must be carried out by a service provider such as an electrician, even when it does not require changing the wiring, positioning of charging stations or branches in the EVS installation.

Typically, the service provider is required to be experienced in electrical engineering and to know how to configure the charging station so that it can operate in the EVS installation.

Hiring a service provider can be very expensive and take a lot of time. The service may involve traveling to the location of the EVS installation, connecting a new charging station to the EVS installation, and doing the necessary configurations of the new charging station to function properly in the EVS installation.

It sometimes happens that a mistake is made either in the physical task of connecting the charging station to the EVS installation or in the task of configuring the charging station. Such a mistake can cause accidents involving electrocution or combustion, or accidents that cause damage to an electric vehicle due to it being connected to the charging station.

In other cases, it can happen that a pre-configured charging station is installed in the wrong place. A way of minimizing the time spent in the trip to the EVS installation is by having the new charging station pre-configured so that it only needs to be connected to the EVS installation. However, this improvement requires storing and maintaining the necessary configuration data at a remote location from the EVS installation, which can require a lot of effort. Also, it requires having control over how the pre-configured charging stations are transported to the EVS installations, because a pre-configured charging station will only work in the intended EVS installation. In practice, it has been observed that it is easy to make mistakes using this improvement. For example, sometimes the human being who pre-configures the charging station is not the same that travels to the EVS installation, and this can easily lead to the charging station being installed in the wrong branch or EVS installation.

US2011/0140657A1 discloses a method and system for deploying electrical charge spots in stages according to demand. During a first stage a plurality of infrastructure adapters are installed. This may involve demolishing and rebuilding portions of the infrastructure and laying down power cables from the electrical power supply to the charge spot locations. The infrastructure adapters are then coupled to an electrical power supply. Many if not all of the infrastructure adapters are covered with a temporary housing protecting them from vandalism and weather. During a second stage, in response to a demand for charge stations, the charge stations are completed. During the second stage, at least one external unit is attached to an infrastructure adapter by making an infrastructure adapter quick connect interface with an external unit quick connect interface. As such, a charge spot is completed quickly in response to demand. Even though it allows for less experienced personnel to carry out the second step, still the required level of experience of the operator is higher than the average consumer. In addition, the method requires the operator to come back in the case of any change that is carried out in the system.

WO2017/044037A1 tries to solve that problem by providing a charging apparatus operable to provide different charging outputs. The charging apparatus includes an adapter configured to receive a power supply cable. The charging apparatus also includes at least one charging module associated with a specific charging output. One of the at least one charging module is operatively and detachably coupled to the adapter. Further, the adapter is configured to be replaceably coupled to other charging modules of the at least one charging module having different charging outputs. Even though this system is already more dynamic than the one of US2011/0140657A1 it still suffers from the drawback that the amount of allowed variations in the system is limited, i.e. it only concerns going up and down in charging current by replacing one charger with another charger of different amperage, but all within the scope of the amperage of the branch to which the system is connected.

All in all there is a further need to improve the existing charging systems for electric cars.

SUMMARY OF THE INVENTION

The invention is defined by the independent claims. The dependent claims define advantageous embodiments.

In a first aspect the invention relates to a charging assembly for charging an electric vehicle, the charging assembly comprising an electrical socket and a charging station. The electrical socket is configured for receiving the charging station and for connecting the charging station to a specific branch of an electric vehicle supply installation, wherein the electric vehicle supply installation comprises a fuse cabinet and at least one branch connected to the fuse cabinet. Furthermore, the electrical socket comprises a data storage medium readable by the charging station. The data storage medium is further configurable with a data field for representing a maximum electrical current that can be drawn from the fuse cabinet by said specific branch. The charging station is configured for being coupled to the electrical socket to be coupled to the specific branch of the electric vehicle supply installation, wherein the charging station is configured for reading the data storage medium including the data fields and for accordingly adapting the way current is drawn from the branch and provided to the electric vehicle. The charging assembly further comprises a communication unit for establishing a communication link with other charging stations in the electric vehicle supply installation for the purpose of coordinating between the charging stations which amount of power may be drawn and/or which electric phase is to be used by each one. The advantage of this embodiment is that the available amount of electrical current per branch may be conveniently and automatically distributed over the active charging stations within one branch. It must be noted that this embodiment of the invention makes it possible to connect multiple charging stations to one branch of the fuse box. This has not been reported in this way in the prior art before. WO2017/044037A1 discloses the use of splitter boxes, which the current invention does not need at all. That is a significant advantage over the prior art.

The effect of the features of the charging apparatus in accordance with the invention is as follows. The electric socket, which is the part that is installed by a skilled operator, comprises the data storage medium with the data field(s). The charging station reads this storage medium and thereby finds out how much electrical current may be drawn from the electric socket. This is in contrast with the solution of WO2017/044037A1, where the intelligence is put into the electric socket, i.e. the electric socket is provided with a reader, which reads the amperage of the charging module, and then adapts the amount of current provided to the charging module accordingly. In the present invention it is different, because the charging module reads the electric sockets, which "knows" how much current is available for the charging module, and subsequently adapts the amount of current drawn from the electric socket.

In a further embodiment of the charging assembly the adapting of the way current is drawn from the branch comprises adapting the amount of electrical current that is drawn from the branch, and/or adapting from which electric phase of the branch the electrical current is drawn from. These two measures constitute the main options of distributing electrical current load on the electric phases of the branch.

In a further embodiment of the charging assembly the data storage medium is configurable with:
 a data field for identifying the specific branch of the electric vehicle supply installation, and
 a data field for identifying the connection of the electrical socket to the specific branch.

A further embodiment of the charging assembly further comprising a communication unit for establishing a communication link with other charging stations in the electric vehicle supply installation for the purpose of one of the following:
 attributing unique identifiers to charging stations in a branch, and
 electing one coordinator/master charging station. These purposes further facilitate convenient and automatic distribution of the current over the active charging stations within one branch.

In a further embodiment of the charging assembly the communication unit is located in the charging station, in the electrical socket or in both parts. The charging station is the "intelligent" part of the system and therefore this part preferably comprises the communication unit. However, it may just as well be placed in the electrical socket or even in both parts.

In a further embodiment of the charging assembly the communication unit is connectable to a communication circuit wired in the electric vehicle supply installation.

In a second aspect the invention relates to the electric socket in the charging assembly according to the invention. The first aspect of the invention is about a charging assembly comprising of two main parts, i.e. the electrical socket and the charging station. These two parts belong together as an electrical plug belongs to an electrical socket. Each part may be sold individually and therefore the inventor is entitled to claims covering each part individually.

Claims 9 to 20 define advantageous embodiments of the electric socket according to the invention, but are also embodiments of the charging assembly in accordance with the first aspect of the invention. Also some of the embodiments of the charging assembly in accordance with the first aspect of the invention are embodiment of the electric socket in accordance with the second aspect of the invention. The advantages and effects are discussed in the detailed description.

In a third aspect the invention relates to the charging station in the charging assembly according to the invention. The first aspect of the invention is about a charging assembly comprising of two main parts, i.e. the electrical socket and the charging station. These two parts belong together as a electrical plug belongs to an electrical socket. Each part may be sold individually and therefore the inventor is entitled to claims covering each part individually.

Claims 22 to 24 define advantageous embodiments of the charging station according to the invention, but are also embodiments of the charging assembly in accordance with the first aspect of the invention. Also some of the embodiments of the charging assembly in accordance with the first aspect of the invention are embodiment of the charging station in accordance with the third aspect of the invention. The advantages and effects are discussed in the detailed description.

BRIEF INTRODUCTION OF THE DRAWINGS

Embodiments of the invention will now be described, by way of example only, with reference to the accompanying drawings, in which.

DETAILED DESCRIPTION OF THE EMBODIMENTS

Figure 1:
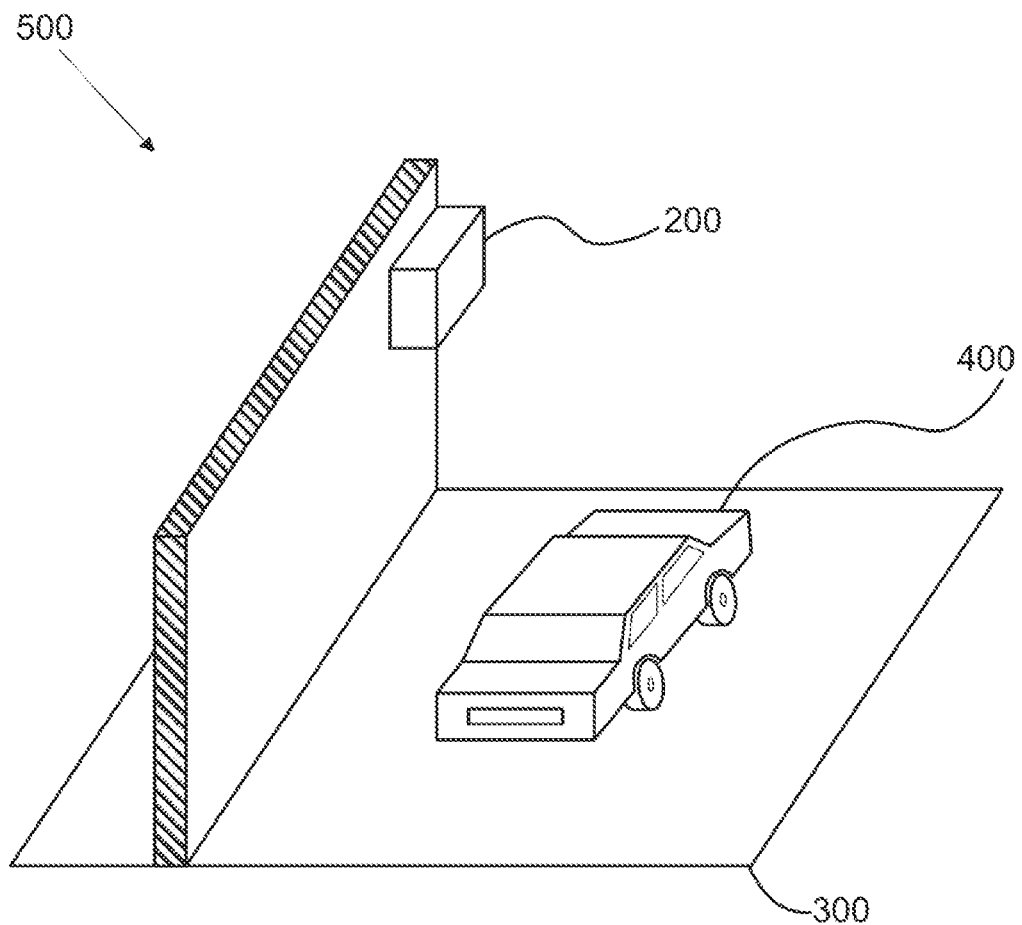
FIG. 1 is a schematic perspective view of an electric car parked in a garage during an initial stage of an installation project.
Figure 2:
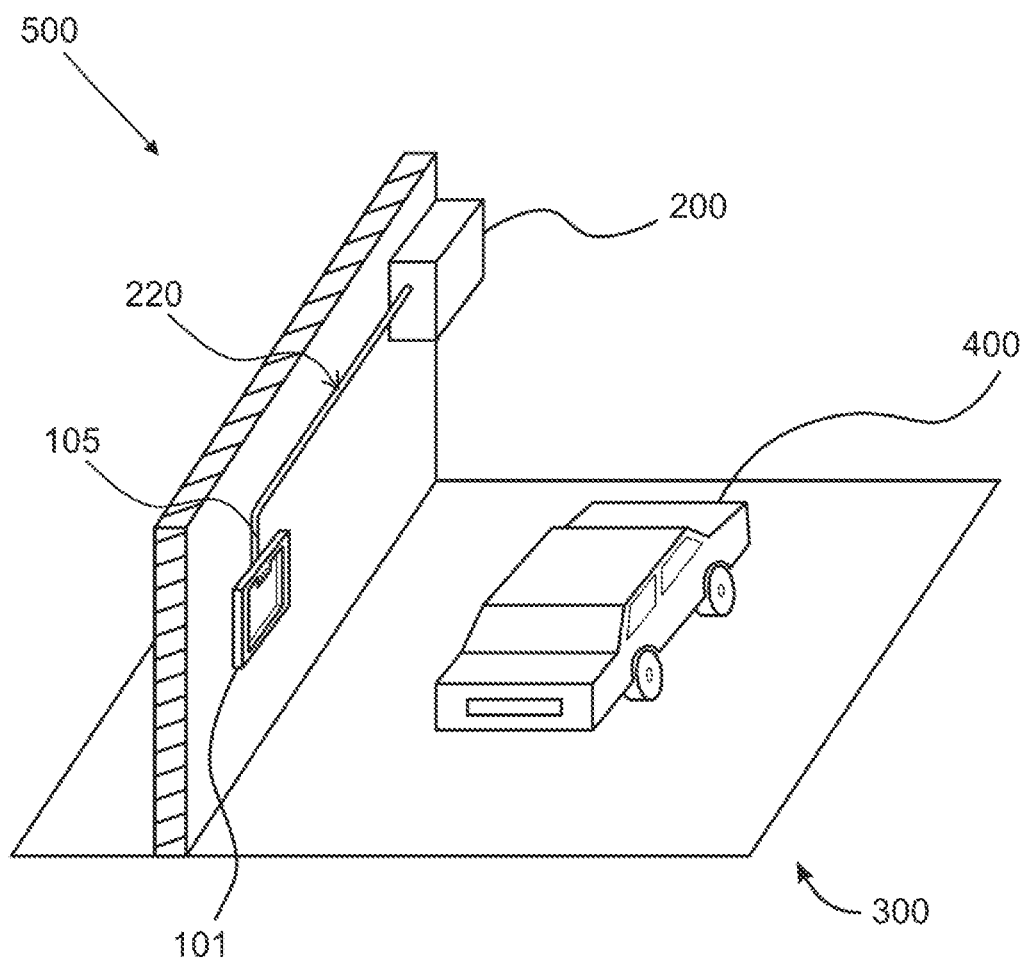
FIG. 2 is a schematic perspective view of the garage in FIG. 1 after a second stage of the installation project.
Figure 4:
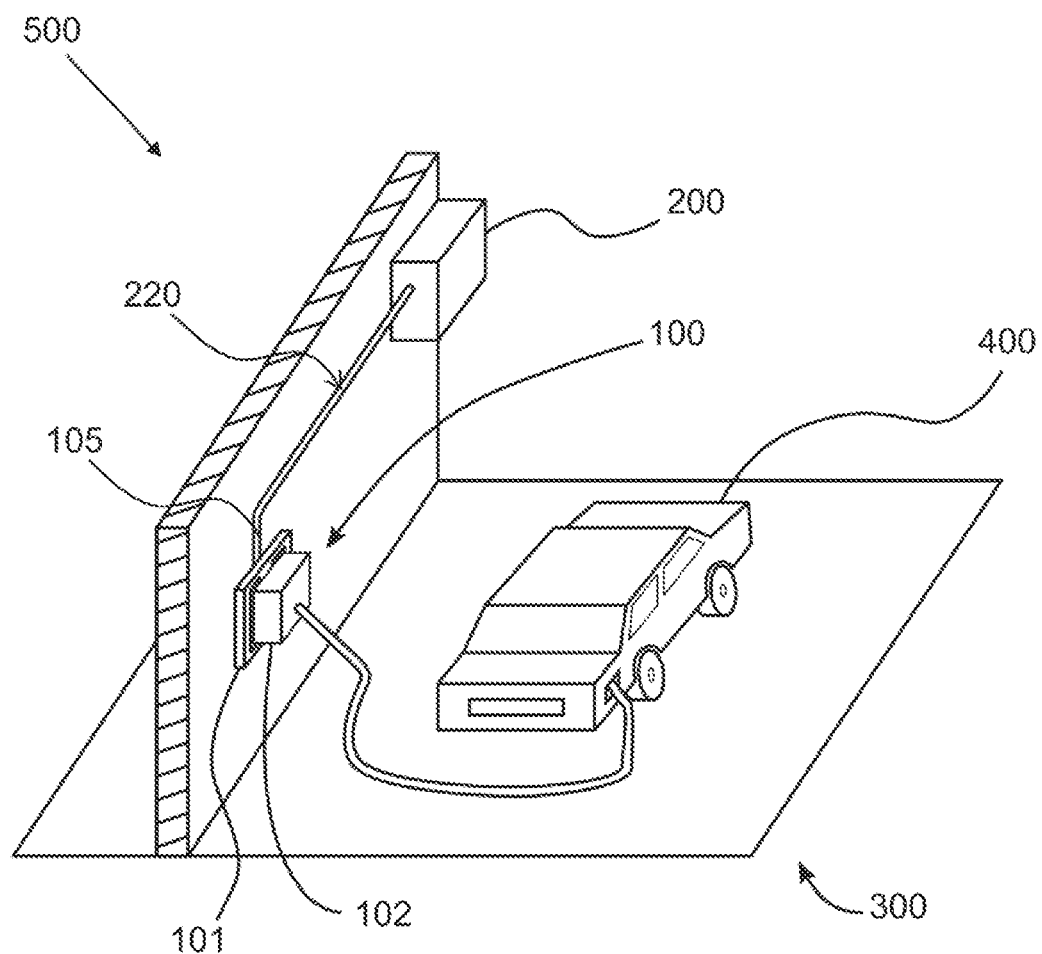
FIG. 4 is a schematic perspective view of the garage in FIGS. 1 and 2 after a third stage of the installation project.

FIGS. 1, 2 and 4 show a parking space in a garage 300 during three stages of an installation project for making available the possibility of recharging electric vehicles in the parking space. In FIG. 1, the parking space is shown in its initial stage without yet being possible to recharge electric vehicles; in FIG. 2, an electrical assembly embodiment 101 is shown after having been set up by an electrician; and in FIG. 4, a test is being performed for recharging an electric car 400.

Turning now to FIG. 1, it shows the electric car 400 parked in the parking space in garage 300.

The garage 300 is part of a building that includes more garages (not shown in FIG. 1). Also, the garage 300 can have an electrical vehicle supply installation 500 set up, and it includes a fuse cabinet 200 on one of its corners.

The electric car 400 could be recharged by a charging station standing nearby. The parking space is sufficiently close to a wall (shown on the left-hand side of FIG. 1) on which a charging station could be provided. That charging station could receive electrical power from the fuse cabinet 200, and an electric cable could then be connected between the electric car 400 and that charging station so that the electric car 400 would be recharged.

However, in the initial stage shown in FIG. 1 there is no charging station available in the garage 300.

FIG. 2 shows the parking space in the garage 300 in FIG. 1 after the second stage of the installation project of the electrical vehicle installation 500 (hereinafter referred to as EVS installation), in which an embodiment of an electrical assembly 101 in accordance with the invention has been set up by an electrician.

The electrical socket 101 is connected to the fuse cabinet 200 by a cable 105 fixed to the wall. The arrangement shown in FIG. 2 forms a simple branch 220 of an EVS installation 500, the branch 220 being formed by the electrical socket 101 and the cable 105 up to the fuse cabinet 200.

The electrician has set up the electrical socket 101 in three sub-stages. First, a task was carried out for safely fixing the electrical socket 101 to the wall, connecting the cable 105 between the electrical socket 101 and the fuse cabinet 200, and fixing the cable 105 to the wall. Secondly, the electrician has configured a data storage medium (not shown in FIG. 2) in the electrical socket 101 with data identifying the branch 220 within the EVS installation and with data identifying the position in series that the electrical socket 101 occupies in the branch 220. Thirdly, the fuse cabinet 200 was configured to provide electrical power to the cable 105. These three sub-stages involved safety measures with which the electrician is expected to be accustomed.

At the end of the second stage of the installation project, no charging station is available in the garage 300 yet, and thus the electric car 400 cannot be charged yet. However, the electrician's work in the project has terminated and no further services are expected to be required from him/her.

Figure 3:
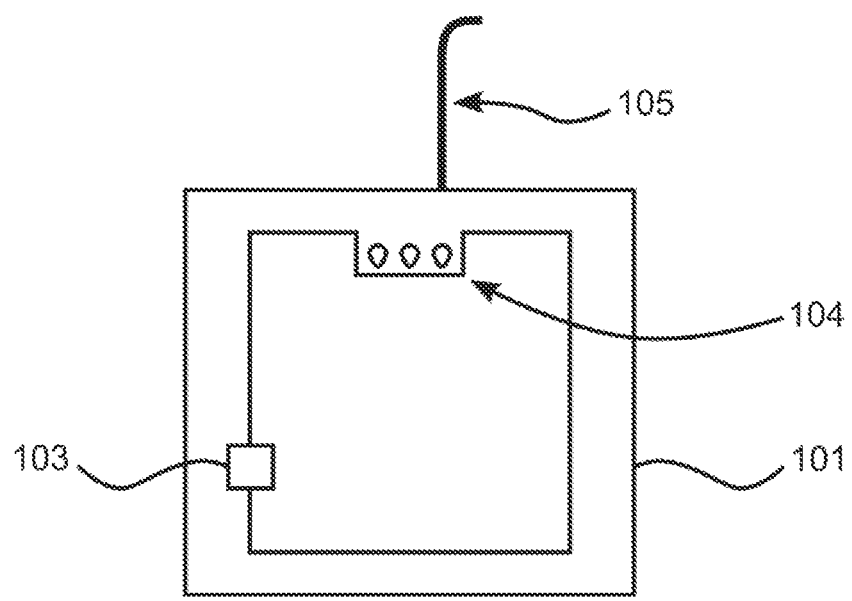
FIG. 3 is a schematic elevation view of the electrical assembly embodiment shown in FIG. 2.

FIG. 3 shows the electrical socket embodiment 101 in more detail.

The electrical socket 101 includes three electrical connectors 104 for receiving pins from a charging station, an electrical connection with the cable 105 for receiving power from the fuse cabinet 200 shown in FIGS. 1 and 2, and an RFID tag 103 for identifying the branch 220 within the EVS installation and the position in series that the electrical socket 101 takes in the branch 220.

The three electrical connectors 104 receive three pins from a charging station and allow establishing an electrical connection between such a charging station and the branch 220.

Moreover, the electrical connectors 104 are arranged inside slots (only the slots are visible in FIG. 3), and this allows increasing the safety of the electrical socket 101 in case of any unexpected discharge that may generate sparks or any electrical arc between the pins of a charging station and the electrical connectors 104. This contributes to the purpose of making it safe and simple to set up a charging station without requiring the help of a skilled technician such as an electrician.

Also, the electrical connectors 104 and the slots are provided in the electrical socket 101 in a manner suitable for having the pins of a charging station face the wall when the latter is being set up or disconnected. This feature contributes to an increased safety, as any sparks, electrical arcs or other kind of dangerous electrical phenomena will happen on the side of the charging station that is opposite to the user holding the charging station. In extreme accidents, the charging station can serve as a protective shield due to the positioning that the pins need to have, in order to allow the charging station to be coupled onto the electrical socket 101.

The number of electrical connectors 104 for connecting pins of the charging station to the cable 105 may vary. In FIG. 3, the electrical socket embodiment 101 has three electrical connectors 104, but this number may be different in other embodiments, depending on the number of connections needed between the charging station and the electrical socket 101.

The RFID tag 103 implements a data storage medium. It is configurable to store a data field for identifying the branch 220 of the EVS installation 500 to which the electrical socket 101 is connected. The RFID tag 103 is also configurable to store a data field for identifying the connection of the electrical socket 101 to the branch 220. Thus, for the situation shown in FIG. 2, these two fields can be respectively configured to identify the first branch 220 of the EVS installation and the first connection in series of the first branch 220.

The RFID tag 103 can be of the passive type, thus having no internal power source and simplifying the construction of the electrical socket 101. Moreover, the RFID tag 103 can instead be of the active type, in which an energy source is necessary for the tag to function. Such a power source can be provided directly from the electrical socket 1010.

The data storage medium can be implemented in any other medium that can be wirelessly read by a charging station, such as by WiFi, Zigbee, and Bluetooth. Also, the data storage medium could also be implemented in an optically readable medium, such as a barcode (eg. a QR-code) printout glued to the electrical socket 101 in a location that can be scanned by the charging station. Moreover, the data storage medium can also be implemented so that the charging station reads its data by wire or some other physical connector. For example, the electrical connectors 104 could include additional electrical connectors for this purpose.

The electrical socket 101 in FIG. 2 is ready for having a charging station set up in a wall-mounted position.

FIG. 4 shows garage 300 after the third stage of the installation project. A charging station 102 has been set up, and the electric car 400 is being recharged.

Setting up the charging station 102 did not require any hiring an electrician, rewiring the cable 105 connecting the electrical socket 101 to the fuse cabinet 200, detaching the electrical socket 101 from the wall, and reconfiguring the fuse cabinet 200. The task of setting of the charging station 102 required raising the latter to the height of the electrical socket 101 and then fastening the former to the latter.

The electric car 400 includes a tank door on its rear half that is connected with one end of an electric cable. The other end of the electric cable is plugged into the charging station 102 that is fastened to the electrical socket 101 in a wall-mounted position.

Figure 5:
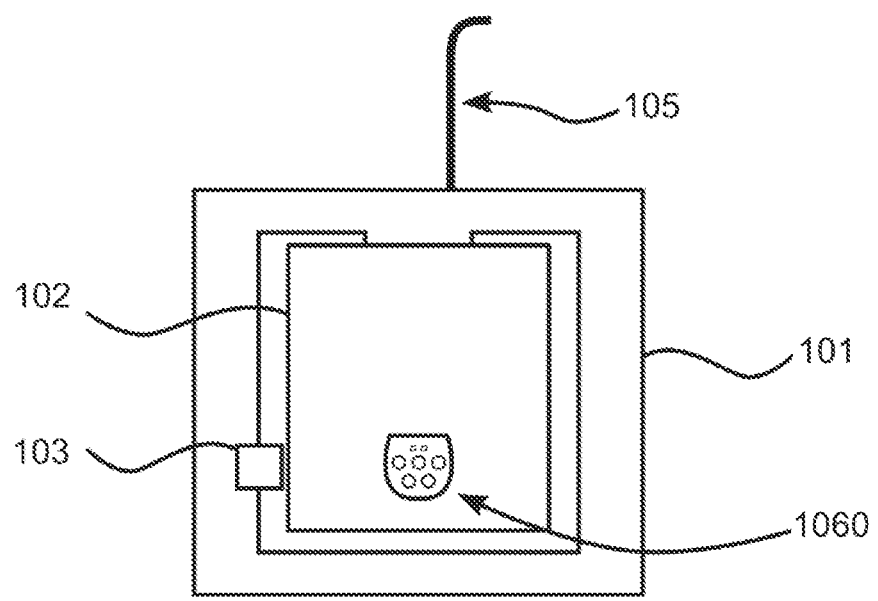
FIG. 5 is a schematic elevation view of the charging station and electrical assembly embodiments shown in FIG. 4.

FIG. 5 shows the electrical socket 101 and the charging station 102 in more detail. The electric cable connecting the charging station 102 and the electric car 400 is not shown.

The charging station embodiment 102 includes three pins (not shown in FIG. 5) connecting to the electrical connectors 104 shown in FIG. 4, a socket 1060 for attaching the plug of the electric cable connecting the charging station 102 and the electric car 400, and an internal electronic circuit (not visible) suitable for reading the data in the RFID tag 103 and adapting the current (power) transmission to the electrical car 400 shown in FIG. 4.

Being fastened to the electrical socket 101, the charging station 102 can read the data configured in the RFID tag 103 and process where it is situated in the EVS installation 500, ie. to which branch 220 and which position in the branch 220 it is drawing current (power) from. The charging station 102 can then adapt how it recharges the electric vehicle 400 (shown in FIG. 4). For example, it may change the amount of current (power) or from which electric phase it draws power from.

The way the charging station 102 adapts how it supplies current (power) to the electric car 400 may then vary from one embodiment to another. In simpler cases, the charging station 102 may be provided with pre-configured values and rules, such as a general value for the maximum current (power) that can be drawn from a branch or a rule establishing that the third electric phase is to be used for all electrical socket positions in a branch that are a multiple of three (e.g. 3, 6, 9, . . . ).

In other embodiments of the charging station 102, other data may be processed based on communications with other nearby charging stations, such as attributing unique identifiers to charging stations in a branch 220, electing one coordinator/master charging station 102, and coordinating between the charging stations 102 which amount of current may be drawn and/or which electric phase is to be used by each one. In any of these cases, the charging station 102 includes a communication unit for establishing a communication link with other charging stations in the EVS installation 500.

Having access to the data in the RFID tag 103, the charging station 102 does not require access to a remote service through the Internet for receiving instructions on how the power is to be drawn from the branch. The coordination with other charging stations, if necessary, can be done locally at the EVS installation 500.

The data storage medium 103 may be configured by the electrician in the second stage (mentioned above when describing FIGS. 2 and 3) to store other relevant data fields. These may be useful for simplifying or improving how the charging station 102 draws current (power) from the branch 220 or how it communicates with other charging stations.

A type of relevant data field relates to the maximum electrical power that can be safely drawn in the specific EVS installation in which the electrical socket 101 is installed. Such data fields may store a value for the maximum electrical power that a charging station 102 may safely draw from the branch 220 via the electrical socket 101 and/or a value for the maximum power that all charging stations in the branch 220 of the electrical socket 101 may draw from the fuse cabinet 200 (shown in FIG. 4).

Another type of relevant data field relates to operational data, such as a unique identifier for identifying the electrical socket 101 and a unique identifier of another electrical socket 101 that is to operate with a charging station acting as a master/coordinator.

A further type of relevant data field relates to access control. In one embodiment, the RFID tag 103 may include a list of identifiers of up to 20 vehicles that are permitted to use a charging station 102 connected to the electrical socket 101. Other possibilities for this type of data are a list of authorised users or a combination of authorised users and vehicles.

Another type of relevant data field relates to security. For example, the RFID tag 103 may include a field with a decryption challenge, which must be used for revealing a password that can then be used for decrypting all other data in the RFID tag 103.

A further type of relevant data field relates to the presentation of information. A field of this type may include the contact information, such as a telephone number or email address, of the owner of the EVS installation 500 or of the electrician that has installed the electrical socket 101, or the physical location of the EVS installation 500, such as its street address.

The charging station 102 can be easily repaired, such as when there is an accident in the socket 1060. For example, if some residue from salty air, air pollution, or mud is accumulated in either the plug of the electric cable or the socket 1060, it can happen that the residue creates a resistance point while a recharging job is happening, resulting in melted parts due to heat dissipation. In this situation, the charging station 102 can be easily replaced and the problem solved without the need to hire an electrician.

FIGS. 6, 7, 8, 9 and 10 show another charging station and electrical assembly embodiments.

Figure 6:
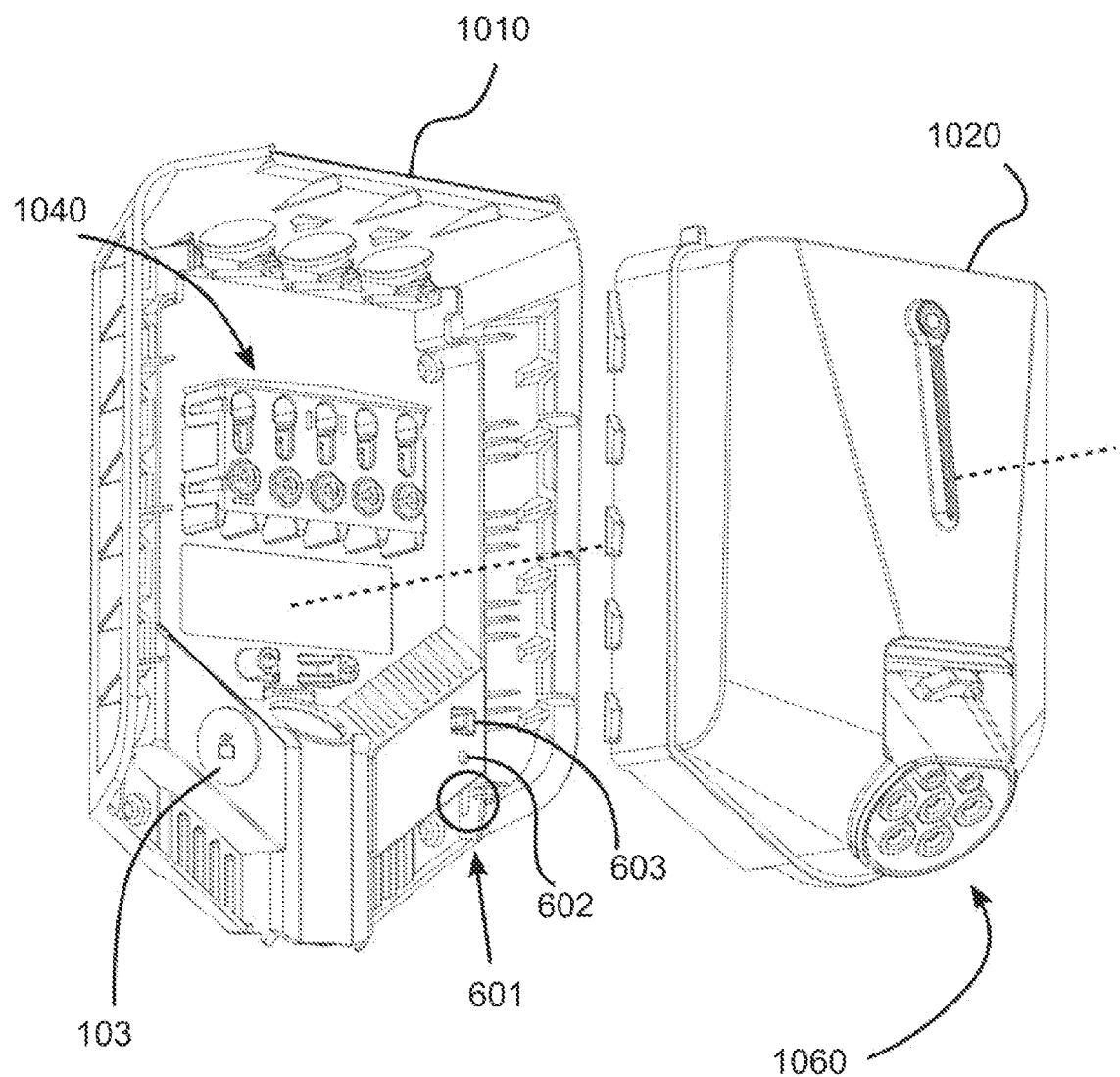
FIG. 6 is a schematic exploded view of another charging station embodiment in front of another electrical assembly embodiment.

FIG. 6 shows an exploded view of a charging station embodiment 1020 in front of an embodiment of an electrical socket 1010 according to the invention. The electrical socket 1010 is shown on the left-hand side of FIG. 6, and the charging station 1020 on the right-hand side.

The electrical socket 1010 is similar to the one shown in FIG. 3, and it includes a data storage medium 103 for identifying a branch 220 and the connection of the electrical socket 1010 to the branch 220, and a set of electrical connectors 104 for connecting pins of the charging station 1020 (the pins are not visible in FIG. 6) to the branch 220.

The data storage medium 103 is implemented as an RFID tag that is configurable to store data fields for the relevant identifications mentioned above. The RFID tag faces the charging station 1020 and can be read when the latter is fastened to the electrical socket 1010.

The electrical connectors 104 in FIG. 6 differ from the ones shown in FIG. 3 in that five electrical connectors 104 are present, instead of three. In this example, it is useful to provide the additional two electrical connectors for the purpose of drawing more electrical current (electrical power) from the branch 220 safely. As mentioned above, the number of electrical connectors may vary on different embodiments.

The electrical socket 1010 and the charging station 1020 are adapted so that the latter may be fastened on the former. The charging station 1020 includes lateral flaps on both sides (one of these is visible on one of the sides of the electrical station 1020 in FIG. 6) that are suitable for entering onto agreeing J-slots on the electrical socket 1010 (one of these is visible on the electrical socket 1010 in the area with reference number 601). The use of J-slots in the electrical socket 1010 achieves a simple solution for fastening the charging station 1020 therein and hold it in a wall-mounted position. The charging station 1020 can be fastened, firstly, by raising it to the height of the electrical socket 1010 on the wall, secondly by pushing the raised charging station 1020 towards the electrical socket 1010 and wall, and thirdly by sliding down the charging station 1020 on the electrical socket 1010 so that the flaps on the charging station 1020 interlock with the J-slots in the electrical socket 1010. The J-slot and flaps coupling is one way of implementing the fastening of the charging station 1020 to the electrical socket 1010, and the skilled person can find other approaches to achieve this.

Given that the charging station 1020 is very easy to set up and disconnect, it may become necessary, in some uses, to lock the charging station 1020 to the electrical socket 1010. This can be achieved by providing the electrical socket 1010 and the charging station 1020 with openings for inserting a lock (not shown in FIG. 5), the openings being suitable for locking the charging station 1020 to the electrical socket 1010. In cases where the owner of the EVS installation 500 is not the same as the owner of the charging station 1020, the electrical socket 1010 and the charging station 1020 can be provided instead with two corresponding openings each, so that each of the two parties is responsible for one of two locks. Thus, this embodiment would result in that the charging station 1020 can only be disconnected from the electrical socket 1010 with a two-party consent.

Moreover, the electrical socket 1010 includes two features for verifying that the pins of the charging station 1020 are properly connected to the electrical connector 1040: a magnet 602 for enabling the charging station 1020 to detect that it has correctly inserted onto the electrical socket 1010, and a clicking mechanism 603 for producing a click sound and inform the user.

The charging station 1020 includes a magnetic sensor (not visible in FIG. 6) for detecting the magnetic field of the magnet 602. The magnet 602 and the magnetic sensor are respectively arranged on the electrical socket 1010 and on the charging station 1020 such that having the charging station 1020 slide on the electrical socket 1010 until it is able to detect the magnet 602 implies that the pins have been correctly connected to the electrical connectors 1040.

The charging station 1020 also includes a mechanical protrusion (not visible in FIG. 6) for engaging the clicking mechanism 603 and produce a click sound when the charging station 1020 has been fully inserted onto the electrical socket 1010. This approach can be a simple way of verifying in a mechanical manner that a proper insertion has been made. It can also be advantageous as it requires no electrical power.

The possibility of verifying if the charging station 1020 has been inserted correctly onto the electrical socket 1010 is further discussed below with reference to FIG. 8.

Figure 7:
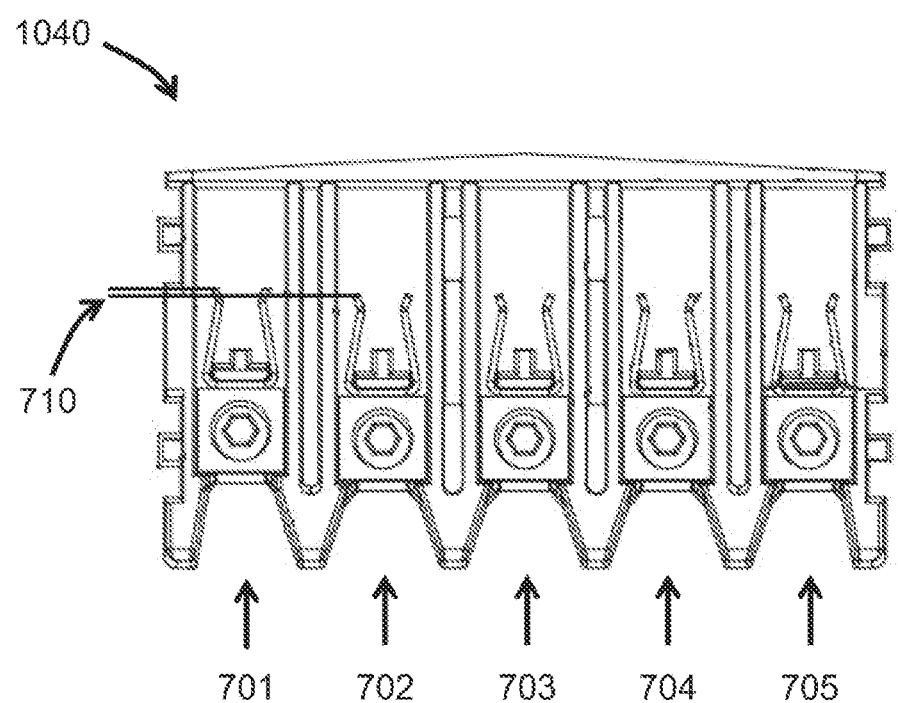
FIG. 7 is a schematic elevation view of the electrical connectors shown in FIG. 6.

FIG. 7 shows the five electrical connectors 1040 in more detail. The front surface in front of the electrical connectors 1040 (shown in FIG. 6) has been removed.

The five electrical connectors 1040 are arranged in a horizontal line and each has a different function. The first electrical connector 701 (shown on the left-hand position in FIG. 7) is for establishing the connection with the protective earth terminal, and its main purpose is to ensure that a possible fault in the internal electronic circuit of the charging station 1020 will not cause a damaging voltage on any surface or component of the charging station 1020. The second, third, fourth and fifth electrical connectors 702, 703, 704, 705 are used for transmitting the electric phases (e.g. N, L1, L2, and L3).

The combination of the arrangement of the five electrical connectors 1040 in a horizontal line with the downward sliding motion (described above with reference to FIG. 6) when setting up the charging station 1020 results in a precise and consistent motion for connecting the pins of the latter to the electrical socket 1010.

In order to allow plugging and unplugging the charging station 1020 without having to turn off the power from the fuse cabinet (this functionality is also known as "hot swap"), the five electrical connectors 1040 are arranged on the electrical socket 1010 such that the first electrical connector 701 is positioned at a different height than the other four electrical connectors 702, 703, 704, 705. In FIG. 7, the first electrical connector 701 is positioned at a slightly higher position 710 than the other connectors, and this results in that the connection of the first electrical connector 701 is established before any of the other. The opposite happens when uninstalling the charging station 1020; that is, the connection of the first electrical connector 701 is terminated only after the connections of all other electrical connectors 702, 703, 704, 705 have been terminated. FIG. 8 shows the charging station 1020 in FIG. 6 after it has been fastened to the electrical socket 1010.

Before a recharging operation may start, it can be advantageous for the user's safety to verify that the pins of the charging station 1020 are all properly connected to the five electrical connectors 1040 shown in FIGS. 6 and 7. As shown in FIG. 8, once the charging station 1020 is placed on the electrical socket 1010, it is not possible to see if the pins have all been correctly connected to the electrical connectors. This verification can be achieved with several approaches.

One approach is to configure the charging station 1020 with the minimum expected value of the signal strength that results from reading the RFID tag 103, and also configuring the charging station 1020 to check whether the current signal strength is equal to or more than the configured minimum expected value.

Another approach is to include a permanent magnet in the electrical socket 1010 and include a magnetic sensor in the charging station 1020 such that the magnetic field of the permanent magnet will be detected by the magnetic sensor when all pins are connected to the five electrical connectors 1040. This approach is mentioned above with reference to the magnet 602 shown in FIG. 6.

A further approach is to include a physical electrical connection between the electrical socket 1010 and the charging station 1020, instead of the permanent magnet and magnetic sensor, such that the physical connection is detected when the charging station 1020 is in the correct position.

Yet another approach is to include a component in the electrical socket 1010 such that a click sound is produced when the charging station 1020 reaches the correct position for having all pins connected. This approach is mentioned above with reference to the clicking mechanism 603 shown in FIG. 6.

Figure 8:
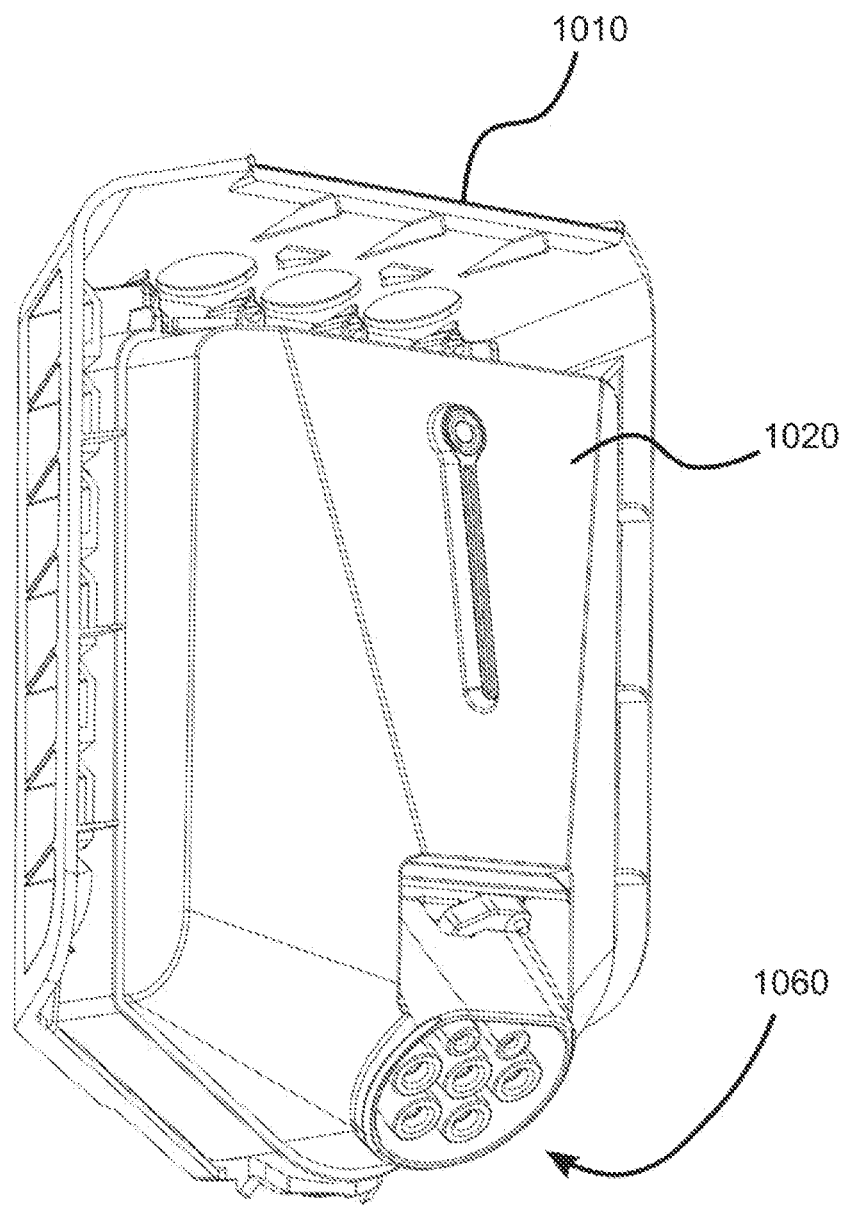
FIG. 8 is a schematic perspective view of the charging station in FIG. 6 fastened to the electrical assembly.
Figure 9:
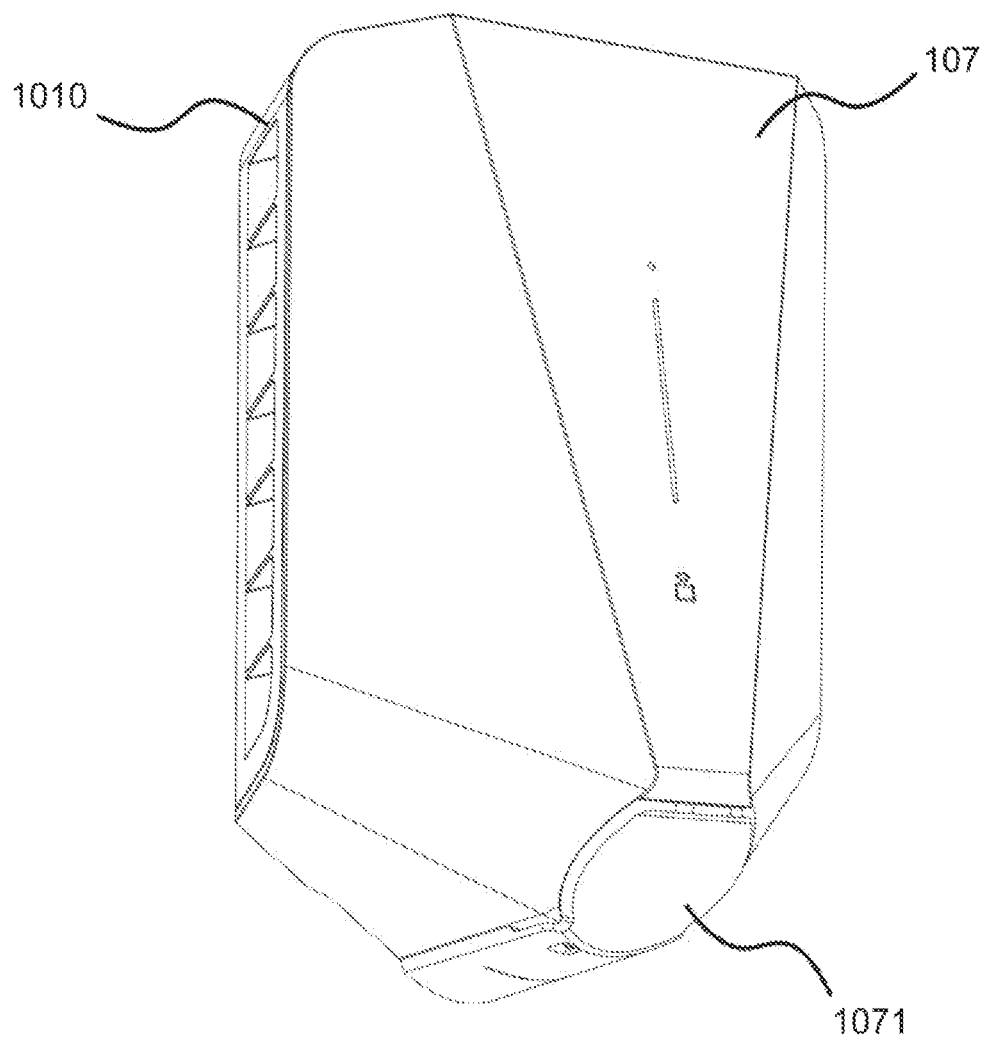
FIG. 9 is a schematic perspective view of the charging station and electrical assembly embodiments in FIGS. 6 and 7 including a cover embodiment.
Figure 10:
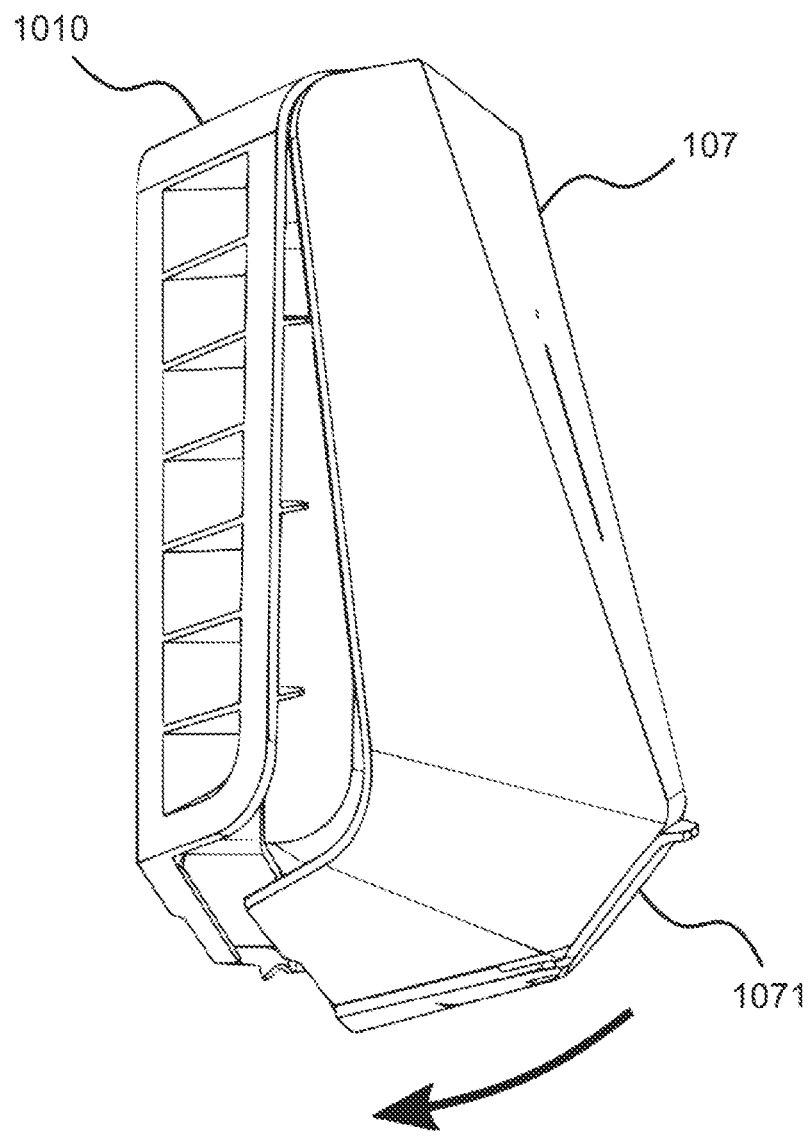
FIG. 10 is a schematic side view when the cover shown in FIG. 9 is being installed.

FIGS. 9 and 10 show a cover embodiment 107 attached over the electrical socket 1010 shown in FIGS. 6 and 8.

When the cover 107 is attached to the electrical socket 1010, it forms a protected habitat for the charging station 1020, enclosing the latter and protecting it from electrical hazards such as humidity or dust. Thus, an electrical car can also be safely recharged outdoors.

The cover 107 includes a lid 1071 for giving access to the socket 1060 and connecting an electric cable. The lid 1071 results in that the socket 1060 is kept protected from any residue transmitted by air, such as humidity or dust, when no cable is connected to it.

In FIG. 10, the cover 107 is shown being installed. The cover 107 is first attached to the upper part of the electrical socket 1010, and then rotated clockwise until its bottom part physically contacts the bottom part of the electrical socket 1010 and the entirety of the charging station is shut under the cover 107. In a preferred embodiment, the lower parts of the electrical socket 1010 and the cover 107 include a fastening mechanism for shutting the cover 107.

Figure 11:
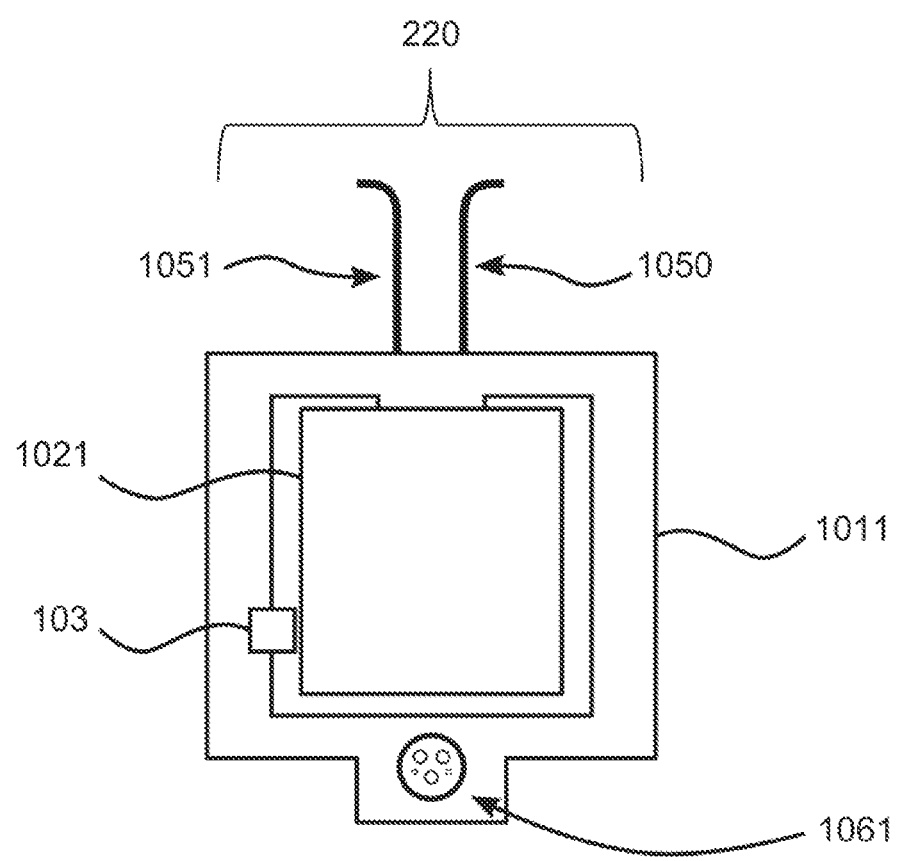
FIG. 11 is a schematic elevation view of a further charging station embodiment fastened to a further electrical assembly embodiment.

FIG. 11 shows another charging station embodiment 1021 set up in another electrical socket embodiment 1011.

These embodiments differ from the ones shown in FIG. 5 in that the electrical socket 1011 includes a socket 1061 or connecting an electric cable plug to the charging station 1021. This is achieved by establishing the connection between the socket 1061 and the charging station 1021 through the electrical socket 1011. In this case, the charging station 1021 includes additional pins and the electrical socket 1011 additional electrical connectors for connecting the additional pins of the charging station 1021 to the socket 1061 for connecting the electric cable plug.

The socket 1061 shown in FIG. 11 is not the same as the socket 1060 shown in FIG. 5. Any type of socket or combination of sockets for electric cable used in electric vehicles can be made available in the charging station and/or electrical socket, such as the IEC 62196 connectors, e.g.: the type 1 connector specified by SAE J1772 (also known as a "J plug"), and the type 2 connector (commonly referred to as Mennekes).

Also, the embodiment of the electrical socket 1011 differs from the one shown in FIG. 5 in that it includes a communication unit for establishing a communication link between the charging station 1021 and another charging station in the EVS installation. This requires the charging station 1021 to be able to communicate with the communication unit in the electrical socket 1011, which could be achieved with a wireless communication means for a short distance or a wired connection. Moreover, the communication unit can include a wireless communication means for communicating with the other charging stations or it can include a connection to a wired communication circuit made available in the EVS installation, such as an Ethernet network.

Moreover, the embodiment of the electrical socket 1011 differs from the one shown in FIG. 5 in that it beside a first cable 1050 includes a second cable 1051 for providing a parallel connection to another electrical socket (not shown). Parallel connection means here that both electrical sockets are connected to the same branch 220 through rerouting from electrical terminals of the first electrical socket 101 to the second electrical socket (not shown) using the second cable 1051. A series of electrical assemblies may thus be connected in parallel using a series of cable segments starting from the fuse cabinet, such that a connection is made between the fuse cabinet and a first electrical socket, and further connections are made between subsequent pairs of electrical assemblies. This arrangement in series forms a branch 220, and the connections of the electrical assemblies to the branch 220 can be distinguished between each other by identifying their position in the branch 220 (eg. first, second, etc. electrical socket).

Figure 12:
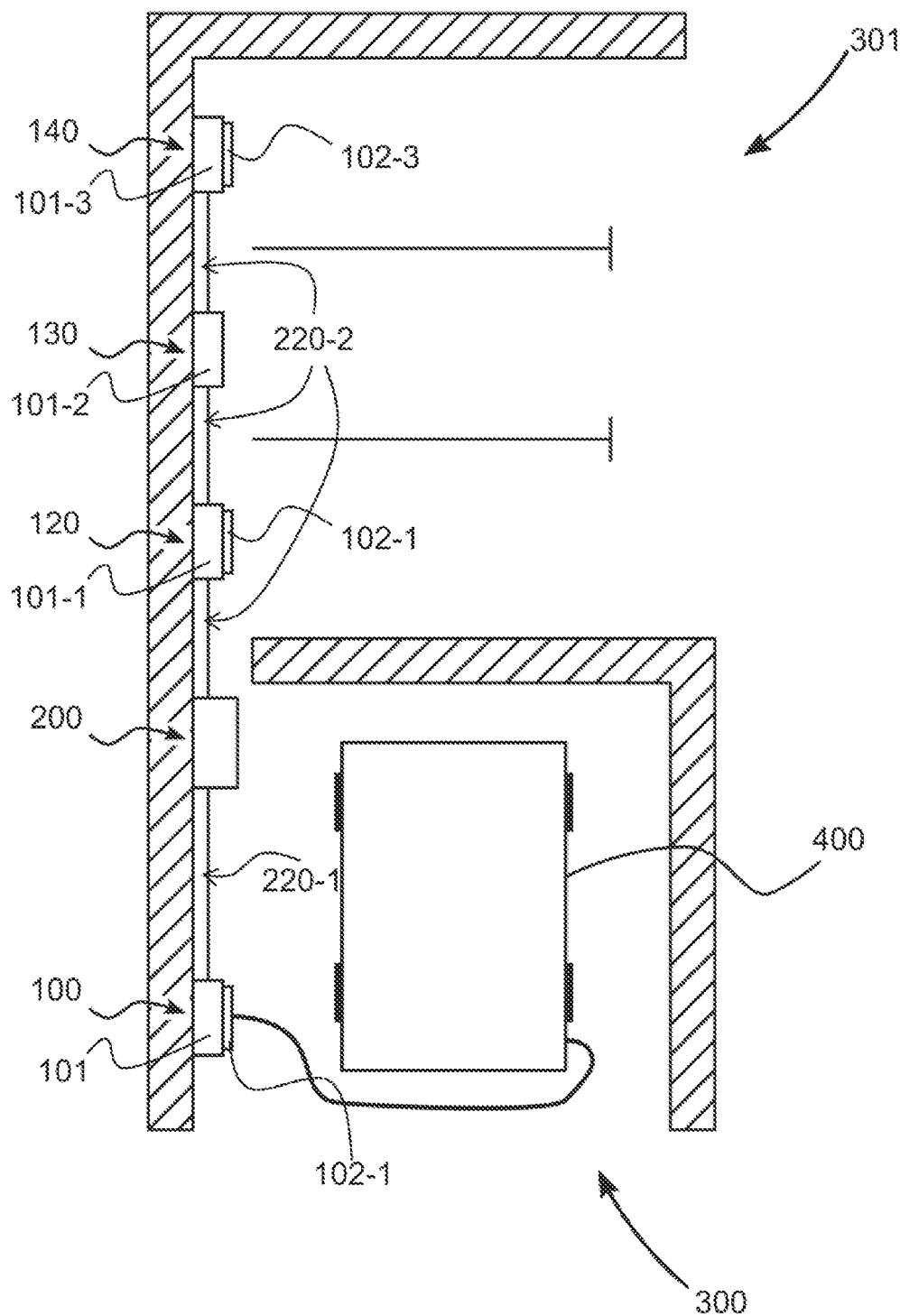
FIG. 12 is a schematic top view of an extended version of the EVS installation shown in FIG. 4 reaching a second garage with a second branch.

FIG. 12 shows a top view of the garage 300, hereinafter referred to as the first garage 300, and an adjoining second garage 301 that is available in the same building. The first garage 300, mentioned in the paragraphs above with reference to FIGS. 1, 2, and 4, is shown in the bottom part of FIG. 11, and the second garage 301 is shown in the upper part. The two garages share the wall on which the charging assembly 100 (comprising the electrical socket 101 and the charging station 102) has been installed on a first branch 220-1 for the first garage 300.

The EVS installation 500 shown in FIG. 4 has been extended so that it reaches the second garage 301 with a second branch 220-2 including three charging assemblies 120, 130, 140 (each having a respective electrical socket 101-1, 101-2, 101-3). Also, two charging stations 102-1, 102-3 have been set up in the second branch 220-2 as illustrated, and one of the electrical assemblies 130 has been left available for fastening a charging station in the future.

Two stages occurred in order to achieve the EVS installation embodiment shown in FIG. 12 when starting from the EVS installation embodiment shown in FIG. 4. First, the EVS installation has been extended with the second branch 220-2; and secondly, two charging stations have been set up in two of the charging assemblies 120, 140 in the second branch 220-2.

The first stage happened in a generally similar fashion to how the first branch 220-1 has been set up, as explained above with reference to FIG. 2. After the planning of how the EVS installation was to be extended given the three parking spaces in the second garage 301, an electrician has been hired to set up the second branch 220-2 in three sub-stages. First, a task was carried out for safely fixing the three electrical assemblies 120, 130, 140 to the wall, connecting the necessary cables between the three electrical assemblies 120, 130, 140 and the fuse cabinet 200, such that the three electrical assemblies form a branch 220-2 in parallel. Also, those cables were fixed to the wall. Secondly, the electrician has configured a data storage medium in each of the three electrical assemblies 120, 130, 140 with data identifying the second branch 220-1 within the EVS installation and with data identifying the position in series that each of the three electrical assemblies 120, 130, 140 occupies in the second branch 220-2, i.e. the first, second, and third electrical assemblies 120, 130, 140. Thirdly, the fuse cabinet 200 was configured to provide electrical current to the second branch 220-2. All of these sub-stages involved typical electrical safety measures, with which the electrician was accustomed.

If the electrical power that is available in the fuse cabinet is sufficient for both the first and second branches 220-1, 220-2, the stage of setting up the second branch 220-2 does not involve changing anything for the first branch 220-1. The data fields configured in the data storage media of all electrical assemblies 101, 120, 130, 140 are structured so that extending or adding branches 220-2 is not dependent on updating the already configured data fields. On the other, if the electrical power that is available in the fuse cabinet 200 is not enough for both the first and the second branches 220-1, 220-2, the electrician also has to change the configuration of the fuse cabinet 200 so that the available electrical power can be shared by both branches 220-1, 220-2. However, even in this case, the data storage medium in the electrical socket 101 does not need to be reconfigured, because the other three electrical assemblies 120, 130, 140 in the second branch are configured with an identification of the second branch.

Until the fuse cabinet 200 is configured to provide power to the second branch 220-2, all tasks for the second branch 220-2 can be done without shutting down the first branch 220-1. This is quite practical in reducing the downtime of the EVS installation 500. Ideally, turning on the electrical power provided by the fuse cabinet 200 for the second branch 220-2 can be done without having to turn off anything else, which eliminates any need for having downtime. Thus, in such a scenario, the tasks related to the setting up of the second branch 220-2 do not affect a recharging operation that may be happening for the electric vehicle 400 at the same time.

The need for the services of the electrician ended with the first stage for achieving the EVS installation embodiment shown in FIG. 12. The second stage was setting up the two charging stations 102-1, 102-3 that are provided on the first and third electrical sockets 101-1, 101-3 in the second branch 220-2.

There are several practical reasons why not all three electrical sockets 101-1, 101-2, 101-3 may be provided with a charging station. A reason may be that the entity investing in the extension of the EVS installation may want to sustain a gradual cost in the financial investment being made. Thus, in such a context the second electrical socket 101 is envisaged to be provided with a charging station in the future if the demand for charging stations in the second garage 301 so requires. Another reason may be that the entity which owns the EVS installation has decided to provide the second electrical assembly 130 as a possible slot for a private charging station. This can be useful in a building where the parking spaces are rented by and assigned to different users. For example, in a building where the rental of an apartment includes the parking space in front of the second electrical assembly 130, a new tenant of such an apartment may bring his/her own charging station, which happens to be compatible with the second electrical assembly 130, and use it.

The two charging stations provided on the first electrical assembly 120 and on the third electrical assembly 140 were set up similarly to how is explained above for the setting up of the charging station 102 with reference to FIG. 4. It also did not require hiring an electrician, rewiring the cables connecting any of the electrical assemblies 120, 130, 140 to the fuse cabinet 200, or detaching any electrical assembly 120, 130, 140 from the wall. An ability the user had to have in order to set up the two charging stations was physically raising them and having them fastened onto the appropriate electrical assemblies 120, 140.

After the two charging stations were set up, there were many possibilities for how they draw electrical power from the second branch 220-2. With the information respectfully read from the data storage media in the first and third electrical assemblies 120, 140, the charging stations 102-1, 102-3 can enter into a communication network in which both charging stations 102-1, 102-3 establish how electrical current (electrical power) is to be drawn from the second branch 220-2, for example to establish in which electrical phase of the second branch 220-2 is the electrical power to be drawn by each charging station 102-1, 102-3.

There are several aspects about the communication network that may be implemented in many different ways.

In the EVS installation embodiment shown in FIG. 12, each charging station has a wireless communication unit for establishing a communication link with other nearby charging stations. However, the communication link can also be established via a communication unit made available in each of the first and third electrical sockets 101-1, 101-2. Such a communication unit can be accessed by the charging stations through wired or wireless technology. Also, that communication unit can permit establishing a wireless communication link with communication units of other electrical assemblies or it may permit establishing a wired communication link through a wired network made available in the EVS installation 500, as explained above with reference to FIG. 11. Moreover, instead of establishing the communication links locally, these can also be established through the Internet by providing a mobile data connection for this purpose, either in the charging stations or in the first and third electrical assemblies.

Moreover, in the EVS installation embodiment shown in FIG. 12, the charging stations are configured to elect a coordinator among the charging stations 102-1, 102-2, i.e. a charging station that collects data from all other charging stations and coordinates how each charging station should operate. The election of the coordinator charging station can be achieved with any known coordinator election algorithm. Alternatively, the EVS installation may include a dedicated master node with the single purpose of coordinating how the charging stations operate in all branches 220-1, 220-2. Such a master node may be implemented with a computational device installed in the fuse cabinet 200. In another alternative, the master node may be defined by the electrician when configuring the data storage medium in each electrical socket 101-1, 101-2, 101-3 by including a data field with the identification of the electrical socket 101-1, 101-2, 101-3 on which the master charging station is positioned. In yet another alternative, the master node function may be carried out by remote server contacted over the Internet.

Furthermore, the way in which the charging stations operate in the EVS installation may be set up statically, by depending only on which electrical assemblies are provided with charging stations, and thus only changing when a charging station is added to or removed from the EVS installation. Alternatively, the operation of the charging stations may be set up dynamically, by also considering live readings of the EVS installation, such as which charging stations are being used for recharging an electric vehicle, or how much time is each electrical vehicle still expected to take until a complete recharge is achieved. In the EVS installation embodiment shown in FIG. 12, the electrical phase of the branch from which the charging stations draw electrical current depends on which charging stations are being used for recharging an electric vehicle.

The data configured in the data storage medium of the electrical socket 101 also allows adding new branches to the EVS installation or extending the first branch with more electrical assemblies without requiring any update in the data configured in the data storage medium of the electrical socket 101. Moreover, the data configured by the electrician in the data storage medium does not need to be copied to any backup medium in order for a charging station to be set up on the electrical socket 101 later on.

The impact of the invention so far described is not to be underestimated. Not only does the invention provide a charging solution, where the charging stations can be easily exchanged without the presence of a skilled operator, also the charging assembly may be completely self-configurating as all required data to configure the charging station is present on the data storage medium that has been installed by a skilled operator.

In order to make a completely self-configuring system, the solution presented in this application takes into consideration several aspects that are novel over the prior art;

First the information that are stored in the storage medium associated with the electrical socket(s) must in itself be sufficient to ensure a correct and electrically safe configuration of the charging station when mounted onto the electrical socket and logically added to the system. This is conveniently implemented in the current invention.

Since the charging stations of the invention are to be addible by non-skilled personnel there is no way to guarantee that the system will be able to obtain correct information about the amount of current that can be drawn from the specific fuse amperage (and fuse characteristics) that the charging station is associated with. This information is also hard to obtain online, since it requires that specific information has been stored in a data base by a skilled person prior to the adding of a new charging station. Also, one cannot guarantee that the charger is able to get online during or after the installation. Therefore, it would be a great advantage if the system were able to self-configure and work safely independent of an internet connection ever being present. This is where the current invention kicks in.

To obtain a completely self-configuring and offline-proof system the local memory of the (pre-installed) electrical socket needs to store two types of information, namely Location ID's (as known from the prior art) and, most importantly, Operating Parameters (not reported in the prior art). It is of no use to only know the ID of the system or the system's components if the facility is offline or if there is no skilled technician around when you add a new charging station. In such case the best option is to also have pre-programmed values for how much energy (amperage) the specific charging station can draw from its associated circuit and/or from specific electrical phases of a branch circuit. This information is essential in order to ensure the safety of the system and to avoid overload and thereby fuses from tripping. This is where the current invention provides a solution.

Further, to be able to make a fully self-configuring system, at least one of the chargers in a facility needs to keep track of the energy demand, energy distribution and remaining current delivering capacity at all times. Since one never knows which electrical socket will be equipped with a charging station first, the choice of a master unit should not be specifically programmed into one of the electrical sockets. This means that all necessary information for a master unit should be available on all the electrical sockets. This means that the total energy capacity (amperage) of the facility should also be stored in all the electrical sockets. This makes it possible to make a fully dynamic setup where a master charger can be chosen freely and on demand without requiring a skilled technician to be present. This is conveniently implemented in embodiments of the current invention.

Besides the above-mentioned advantages over the prior art, the invention also achieves the following:

1) Cost Benefits:

Since the electrical socket of the invention requires no special parts, like electrical signal connectors, signal cables, power sources, battery compartments or electronics compartments and PBC's (with the need for watertight gaskets, coatings or protective moulding), low cost production methods and materials can be used for the whole design.

Since there is no need to use or mix special plastics into the design, like silicone, rubber or other advanced sealing materials, the electrical socket can more easily be recycled, thus reducing its lifetime environment impact.

High-speed standard precision (plastic) molding can be used for the whole design, since there are no small contact elements present that would require high-precision or special tolerance or material considerations.

Also, the main power contact elements (both male and female) may be fastened directly to their respective power terminals, in such a way that no internal cables are needed. This is further reducing both cost and complexity of the design.

2) Reliability Benefits:

Several embodiments of the invention use RFID for data storage & transfer or other wireless contact technologies as discussed. This requires no galvanic contacts for data and/or energy transfer between the charging module and a low voltage part of the electrical socket. The prior art, on the contrary, discloses the use of galvanic contacts and will therefore be sensitive to dirt, pollution, particles, dust, salts, corrosion and/or water being present on the terminals before or during its use. When placing low voltage signals and high voltage signals on the same connector/assembly, you need to take into consideration the above and how it is affecting the systems reliability, especially over time and in an outdoor environment. Phenomenon like creepage currents, sparks, metal (rust) depletion, salt depletion and electrically conducting particles may affect the low voltage data signal transfer, thus making the system useless or unstable—unless advanced and (often) costly sealing systems are used.

The invention may use a storage medium which is completely water- and pollution-tight. It is small and therefore very easy to mount onto for example an electrical socket. The RFID/NFC technology is well-proven and has been successfully used for several decades. It uses no batteries and does not need a separate power source. It uses no external wires and does not rely on a dedicated power source in order to work. It has built-in data receiver, power receiver and memory in one single unit (RFID/NFC tag) and can reliably store the data for 20+ years.

3) Programming Benefits and Data Safety:

All the data needed by the charging module upon connection to the electrical socket, according to the invention, may be stored at one location and in one physical chip, making it virtually impossible to read the data content without having the proper access codes or decryption keys. Prior art is requiring additional (external) data communication to/from a storage medium or a cloud-based service. In such case it becomes critical to encrypt the data or restrict access to the storage medium by special means. This sever problem is not mentioned in the prior art. This becomes even more critical when the storage medium can be physically accessed and altered via exposed cables, connectors or other components in the same system. If the memory bus in any way can be accessed by an unauthorized person it will allow the content of the storage medium to be read or altered. This can for example be tempting if someone wants to illegally draw energy from a charging station and avoid paying for the energy used. Also, the allowed amount of energy to be drawn can be altered, thus compromising the electrical safety of the system.

The data, according to embodiments of the present invention, is not transferred over wires or a normal wireless link, but uses instead a short-range communication principle (RFID/NFC) that allows only a few centimetres of distance between the transmitter and the receiver. Further, to avoid unauthorized access to the storage medium it may be purposely placed on the backside of the charger when the charger is fully mounted. This restricts physical access to the storage medium and effectively keeps it from being physically accessible and readable by unauthorized personnel. In addition, the data storage medium can be protected by cryptographic means and/or passwords. The same principle is now adopted by most payment solution providers as it is regarded as the safest contactless way of transferring secure data.

The same storage medium may be configured (programmed) via a standard smartphone, requiring no extra equipment or investments for the electrician or other authorized personnel that is given the task or pre-programming the memory chip (RFID).

The invention is further related to the following configurations.

Configuration 1. An electrical assembly (referred to as electrical socket in the rest of the description) for connecting a charging station to a branch circuit (also being referred to as branch in this description) of an electric vehicle supply (EVS) installation, the electrical assembly comprising:

a data storage medium readable by the charging station, wherein the data storage medium is configurable with:
a data field for identifying the branch circuit of the EVS installation and
a data field for identifying the connection of the electrical assembly to the branch circuit.

Configuration 2. Electrical assembly according to configuration 1, wherein the data field for identifying the connection is suitable for identifying a position in series in the branch circuit.

Configuration 3. Electrical assembly according to any of the configurations 1 to 2, comprising an electrical connector for connecting a pin of the charging station to the branch circuit.

Configuration 4. Electrical assembly according to configuration 3, comprising a slot for receiving the pin of the charging station, wherein the electrical connector is inside the slot.

Configuration 5. Electrical assembly according to any of the configurations 1 to 4, wherein the electrical assembly is adapted for holding the charging station in a wall-mounted position.

Configuration 6. Electrical assembly according to configuration 6, comprising a J-slot for fastening the charging station to the electrical assembly.

Configuration 7. Electrical assembly according to any of the configurations 3 to 4 and any of the configurations 5 to 6, wherein the electrical connector is arranged so that the pin of the charging station in a wall-mounted position faces the wall.

Configuration 8. Electrical assembly according to any of the configurations 1 to 7, wherein the data storage medium is configurable with a data field for representing a maximum power that can be drawn by the charging station.

Configuration 9. Electrical assembly according to any of the configurations 1 to 8, wherein the data storage medium is configurable with a data field for representing a unique identifier of the electrical assembly.

Configuration 10. Electrical assembly according to any of the configurations 1 to 9, wherein the data storage medium is wirelessly readable.

Configuration 11. Electrical assembly according to configuration 10, wherein the data storage medium is an RFID tag.

Configuration 12. Electrical assembly according to any of the configurations 1 to 9, wherein the data storage medium is optically readable.

Configuration 13. Electrical assembly according to configuration 12, wherein the data storage medium is a barcode.

Configuration 14. Electrical assembly according to any of the configurations 1 to 13, wherein the electrical assembly is adaptable to mechanically lock the charging station to the electrical assembly.

Configuration 15. Electrical assembly according to any of the configurations 1 to 14, comprising a socket for connecting an electric cable plug to the charging station.

Configuration 16. Electrical assembly according to any of the configurations 1 to 15, comprising a communication unit for establishing a communication link between the charging station and another charging station.

Configuration 17. Electrical assembly according to configuration 16, wherein the communication unit is connectable to a communication circuit wired in the EVS installation.

Configuration 18. A charging station for electric vehicles adapted to be connected by the electrical assembly described in any of the configurations 1 to 17 to a branch circuit of an EVS installation.

Configuration 19. Charging station according to configuration 18, comprising a pin arranged for being received by an electrical connector of the electrical assembly.

Configuration 20. Charging station according to any of the configurations 18 to 19, comprising a flap for sliding into a J-slot of the electrical assembly and fastening the charging station to the electrical assembly.

Configuration 21. Charging station according to any of the configurations 18 to 20, comprising a communication unit for establishing a communication link with another charging station connected to a branch circuit of the EVS installation.

Configuration 22. Charging station according to any of the configurations 18 to 21, comprising a socket for plugging in an electric cable plug to the charging station.

According to a first aspect of the configurations, there is provided an electrical assembly for connecting a charging station to a branch circuit of an EVS installation, the electrical assembly comprising a data storage medium readable by the charging station, wherein the data storage medium is configurable with:
- a data field for identifying the branch circuit of the EVS installation and
- a data field for identifying the connection of the electrical assembly to the branch circuit.

The data field for identifying the connection can be suitable for identifying a position in series in the branch circuit.

The electrical assembly may include an electrical connector for connecting a pin of the charging station to the branch circuit. Also, the electrical assembly may comprise a slot for receiving the pin of the charging station, wherein the electrical connector is inside the slot.

Moreover, the electrical assembly may be adapted for holding the charging station in a wall-mounted position. This may be achieved with a J-slot for fastening the charging station to the electrical assembly. The electrical connector mentioned above may be arranged so that the pin of the charging station in a wall-mounted position faces the wall.

The data storage medium may be configurable with a data field for representing a maximum power that can be drawn by the charging station, and/or a data field for representing a unique identifier of the electrical assembly.

The data storage medium may be wirelessly readable, such as an RFID tag. Alternatively, the data storage medium may be optically readable, such as a barcode (e.g. a linear barcode or a QR-code).

The electrical assembly may be adaptable to mechanically lock the charging station to the electrical assembly. Also, the electrical assembly may include a socket for connecting an electric cable plug to the charging station. Moreover, it may include a communication unit for establishing a communication link between the charging station and another charging station. The communication unit may be connectable to a communication circuit wired in the EVS installation.

According to another aspect of the configurations, there is provided a charging station for electric vehicles adapted to be connected by the electrical assembly described above to a branch circuit of an EVS installation.

The charging station may include a pin arranged for being received by an electrical connector of the electrical assembly. Also, the charging station may include a flap for sliding into a J-slot of the electrical assembly and fastening the charging station to the electrical assembly. Moreover, the charging station may include a communication unit for establishing a communication link with another charging station connected to a branch circuit of the EVS installation. And also, the charging station may include a socket for plugging in an electric cable plug to the charging station.

Generally, the terms used in this description and claims are interpreted according to their ordinary meaning in the technical field, unless explicitly defined otherwise. Notwithstanding, the terms "comprises" and "comprising" and variations thereof mean that the specified features, steps or integers are included. These terms are not interpreted to exclude the presence of other features, steps or integers. Furthermore, the indefinite article "a" or "an" is interpreted openly as introducing at least one instance of an entity, unless explicitly stated otherwise. An entity introduced by an indefinite article is not excluded from being interpreted as a plurality of the entity.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the embodiments described above, many equivalent modifications and variations will be apparent to those skilled in the art when given this disclosure. Accordingly, the embodiments of the invention set forth above are considered to be illustrative and not limiting. Various changes to the described embodiments may be made without departing from the spirit and scope of the invention.

The invention claimed is:

1. A charging assembly for charging an electric vehicle, the charging assembly comprising:
   an electrical socket;
   a charging station; and
   a communication unit,
      wherein the electrical socket is configured to receive the charging station, thereby electrically connecting the charging station to a specific branch of an electric vehicle supply installation,
      the charging station is configured to couple to the electrical socket, thereby electrically connecting the charging station to the specific branch of the electric vehicle supply installation, and
      the electric vehicle supply installation comprises a fuse cabinet and at least one branch connected to the fuse cabinet;
   wherein the electrical socket comprises:
      a data storage medium readable by the charging station, wherein the data storage medium includes a data field indicative of a maximum electrical current that can be drawn from the fuse cabinet by said specific branch; and
   wherein the charging station is configured to:
      read the data storage medium including the data field; and
      adapt how current is drawn from the specific branch and provided to the electric vehicle based on the data field indicative of the maximum electrical current;
   wherein the communication unit is configured to establish a communication link with other charging stations in the electric vehicle supply installation to facilitate coordination between the charging stations an amount of electrical current that may be drawn and/or which electric phase is to be used by each charging station.

2. The charging assembly according to claim 1, wherein the adapting of how current is drawn from the branch comprises adapting the amount of electrical current that is drawn from the branch, and/or adapting from which electric phase of the branch the electrical current is drawn.

3. The charging assembly according to claim 1, wherein the data storage medium is configurable with a data field for representing a maximum electrical current that can be drawn by the charging station from the specific branch via the electrical socket.

4. The charging assembly according to claim 1, wherein the data storage medium is configurable with:
   a data field for identifying the specific branch of the electric vehicle supply installation, and
   a data field for identifying the connection of the electrical socket to the specific branch.

5. The charging assembly according to claim 1, wherein the communication unit for establishing a communication link with other charging stations in the electric vehicle supply installation facilitates at least one of the following:
   attributing unique identifiers to charging stations in a branch, and
   electing one coordinator/master charging station.

6. The charging assembly according to claim 1, wherein the communication unit is located in the charging station, in the electrical socket or in both parts.

7. The charging assembly according to claim 6, wherein the communication unit is connectable to a communication circuit wired in the electric vehicle supply installation.

8. An electrical socket of a charging assembly for charging an electric vehicle, the electric socket comprising:
   a data storage medium readable by a charging station,
   wherein the electrical socket is configured to:
      receive the charging station; and
      connect the charging station to a specific branch of an electric vehicle supply installation,
         wherein the electric vehicle supply installation comprises a fuse cabinet and at least one branch connected to the fuse cabinet;
   wherein the data storage medium includes a data field indicative of a maximum electrical current that can be drawn from the fuse cabinet by said specific branch;
   the charging station is configured to:
      couple to the electrical socket, thereby electrically connecting the charging station to the specific branch of the electric vehicle supply installation;
      read the data storage medium including the data field; and
      adapt how current is drawn from the specific branch and provided to the electric vehicle based on the data field indicative of the maximum electrical current; and
   wherein the charging assembly comprises a communication unit configured to establish a communication link with other charging stations in the electric vehicle supply installation to facilitate coordination between the charging stations an amount of electrical current that may be drawn and/or which electric phase is to be used by each charging station.

9. The electrical socket according to claim 8, wherein the data field for identifying the connection is suitable for identifying a position in series in the branch.

10. The electrical socket according to claim 8, comprising an electrical connector for connecting a pin of the charging station to the branch.

11. The electrical socket according to claim 10, comprising a slot for receiving the pin of the charging station, wherein the electrical connector is inside the slot.

12. The electrical socket according to claim 8, wherein the electrical socket is adapted for holding the charging station in a wall-mounted position.

13. The electrical socket according to claim 12, comprising a J-slot for fastening the charging station to the electrical socket.

14. The electrical socket according to claim 10, wherein the electrical connector is arranged so that the pin of the charging station in a wall-mounted position faces a wall.

15. The electrical socket according to claim 8, wherein the data storage medium is configurable with a data field for representing a unique identifier of the electrical socket.

16. The electrical socket according to claim 8, wherein the data storage medium is wirelessly readable.

17. The electrical socket according to claim 16, wherein the data storage medium is an RFID tag.

18. The electrical socket according to claim 8, wherein the data storage medium is optically readable.

19. The electrical socket according to claim 18, wherein the data storage medium is a barcode.

20. The electrical socket according to claim 8, wherein the electrical socket is adaptable to mechanically lock the charging station to the electrical socket.

21. A charging station of a charging assembly, the charging station configured to:
   couple to an electrical socket comprising a data storage medium readable by the charging station, thereby electrically connecting the charging station to a specific branch of an electric vehicle supply installation,
      wherein the data storage medium includes a data field indicative of a maximum electrical current that can be drawn from a fuse cabinet by said specific branch, and
      wherein the electrical socket is configured to:
         receive the charging station; and
         connect the charging station to the specific branch of the electric vehicle supply installation,
            wherein the electric vehicle supply installation comprises a fuse cabinet and at least one branch connected to the fuse cabinet;
   and
   read the data storage medium including the data fields; and
   adapt how current is drawn from the specific branch and provided to an electric vehicle based on the data field indicative of the maximum electrical current; and
   wherein the charging assembly further comprises a communication unit configured to establish a communication link with other charging stations in the electric vehicle supply installation to facilitate coordination between the charging stations an amount of electrical current that may be drawn and/or which electric phase is to be used by each charging station.

22. The charging station according to claim 21, comprising a pin arranged for being received by an electrical connector of the electrical socket.

23. The charging station according to claim 21, comprising a flap for sliding into a J-slot of the electrical socket and fastening the charging station to the electrical socket.

24. The charging station according to claim 21, comprising a socket for plugging in an electric cable plug to the charging station.

* * * * *